(12) United States Patent
Tanaka

(10) Patent No.: US 8,036,724 B2
(45) Date of Patent: Oct. 11, 2011

(54) PORTABLE DATA TERMINAL AND FUNCTION SELECTING AND STARTING METHOD USED THEREIN

(75) Inventor: Shouichi Tanaka, Saitama (JP)

(73) Assignee: NEC Corporation, Tokyo (JP)

( * ) Notice: Subject to any disclaimer, the term of this patent is extended or adjusted under 35 U.S.C. 154(b) by 1047 days.

(21) Appl. No.: 11/887,493

(22) PCT Filed: Mar. 28, 2006

(86) PCT No.: PCT/JP2006/306206
§ 371 (c)(1),
(2), (4) Date: Sep. 28, 2007

(87) PCT Pub. No.: WO2006/106640
PCT Pub. Date: Oct. 12, 2006

(65) Prior Publication Data
US 2009/0111536 A1  Apr. 30, 2009

(30) Foreign Application Priority Data
Mar. 30, 2005  (JP) ................................. 2005-096636

(51) Int. Cl.
H04M 1/00 (2006.01)
G09G 5/00 (2006.01)
H04B 1/38 (2006.01)
H04W 24/00 (2009.01)

(52) U.S. Cl. .................. 455/575.3; 455/550; 455/556.1; 455/456.1; 455/90.1; 345/156

(58) Field of Classification Search .................. 455/550, 455/575.3
See application file for complete search history.

(56) References Cited

U.S. PATENT DOCUMENTS

| 6,580,928 | B1 | 6/2003 | Aoki | |
|---|---|---|---|---|
| 2003/0008679 | A1* | 1/2003 | Iwata et al. | 455/556 |
| 2003/0162560 | A1 | 8/2003 | Kaneko | |
| 2004/0204059 | A1* | 10/2004 | Wong et al. | 455/556.1 |
| 2004/0257334 | A1* | 12/2004 | Yajima | 345/156 |
| 2006/0148540 | A1* | 7/2006 | Satoh et al. | 455/575.3 |
| 2009/0275361 | A1* | 11/2009 | Takahashi | 455/556.1 |

FOREIGN PATENT DOCUMENTS

| CN | 1268860 A | 10/2000 |
|---|---|---|
| CN | 1449173 A | 10/2003 |
| EP | 1 052 580 A1 | 11/2000 |
| EP | 1 298 890 A2 | 4/2003 |
| EP | 1 465 392 A2 | 10/2004 |
| GB | 2 349 777 | 11/2000 |
| GB | 2 387 511 A | 10/2003 |
| JP | 2000-261544 | 9/2000 |
| JP | CN 1416228 A | 5/2003 |
| JP | 2003-258944 | 9/2003 |
| JP | 2004-274494 | 9/2004 |
| WO | WO 01/84729 A1 | 11/2001 |

* cited by examiner

*Primary Examiner* — Pierre-Louis Desir
*Assistant Examiner* — Timothy Pham
(74) *Attorney, Agent, or Firm* — Scully, Scott, Murphy & Presser, P.C.

(57) ABSTRACT

A selection operation of function of a fold-type housing for each shape is stored as a function history of each shape in a function history storage section 16. Each shape is judged based on the result of each of detections by a first sensor (12), a second sensor (13), and a swivel sensor (14), and the function history is read from the function history storage section (16) based on the judgment result. When one of the function histories displayed corresponding to each shape is selected by a side key, a control section (11) starts the function.

20 Claims, 8 Drawing Sheets

PORTABLE DATA TERMINAL AND FUNCTION SELECTING AND STARTING METHOD USED THEREIN

TECHNICAL FIELD

The present invention relates to a portable data terminal and a function selecting and starting method, and more particularly, to a method for selecting and starting a function provided in a portable data terminal.

BACKGROUND ART

Current portable data terminals have a broad variety of functions such as TV (Television) telephonic function, camera function, Internet function, as well as TV receiving function, FM (Frequency Modulation) radio receiving function, in addition to the basic functions including telephonic function and mail function.

In the housing thereof, however, a smaller size is attained in pursuit of the convenience in handling thereof, and the number of operational keys is restricted. For this reason, a menu screen is used for selection of a block of related functions, from which the intended function is selected. Thus, the menu employs a considerably deep hierarchic structure, wherein a large number of key operations are necessary for selecting the desired function. This causes the problem of complicated operations and time consuming.

In general, selection of each function is allocated to a management number, and the management number may be directly input after depression of the menu key. However, the variety of functions provided therein as described above causes a difficulty in memorizing those of functions other than those used frequently. Eventually, it is necessary to trace the function along the hierarchical structure of the menus.

As to the general function of the telephone call, most of the terminals have a function of displaying the history of outgoing calls and received calls to allow the user to initiate an outgoing call with ease. However, the frequency of use of the terminals as a mere telephone is reduced nowadays. Thus, there is a subject to be solved how to select the desired function and operation with ease from the items of the variety of other functions.

In view of the above, there is a technique in which the operated function histories are sorted and stored in an order of arrangement based on the number of times used, and a stored function histories are called by a dedicated key, whereby a desired function is selected while scrolling by way of up/down keys and determined by depressing an enter key (refer to Patent Publication 1, for example).

However, use of the function history yet necessitates a significant number of key operations including depressions of history calling key, selection by up/down keys and depression of enter key, although the function may be selected by a less number of key operations compared to a first time operation. In addition, the weighting by the number of operations necessitates a plurality of number of key depressions during the scroll using the down key if a function used only once is to be called, and is also inconvenient.

There is another method in which the operation history for setting the function is stored in a memory, similarly to the above technique, and depression of the key for calling the operation history allows three latest operations to be displayed in order (refer to Patent Publication 2, for example).

In this technique, if the received-volume setting is operated, for example, only the received-volume setting is possible upon the calling, and thus there is also a problem that the related function group including the received tone setting, for example, cannot be called.

There is further another method in which a judgment as to whether the storage is performed at selection or at execution is added for a weighting operation during selection of the function, thereby providing an ingenuity that all of the selected ones are not stored (refer to Patent Publication 3, for example). In the case of this technique, the configuration is such that the functions included in the same function group can be selected with ease. More concretely, a direct operation history is selected by the up/down scroll, whereby left/right keys can call the functions in the same function group.

In the case of this technique, there is a problem in that the current cellular phones have a variety of functions which cannot be realized only by guiding the operation, such as input of characters that the user can arbitrarily select or access to the Internet, and that the function and configuration of the up-to-date cellular phones have a complicated transition, whereby only a change of a single setting or stating of a desired function requires a large number of key operations.

As a method for solving the above problems, there is a proposal for a cellular phone in which the values arbitrarily input by the user are accurately reproducible by learning the key operations (refer to Patent Publication 4, for example). In the case of this technique, creation of a mail is registered in the midway thereof as a learned history, whereby another mail can be created until the input of destination and input of the title.

There is another solution in which a single key is allocated to a function which is fixedly assigned to a softkey and to a higher-order function counting the number of started times thereof, and a timer is stared when the softkey is depressed, wherein, if the softkey is depressed twice within a specific period of time, the application function that is set based on the number of starting times is started, whereas if the softkey is depressed once, the function fixedly allocated thereto is started after the specific period of time is elapsed (refer to Patent Publication 5).

Patent Publication 1: JP-2000-261544A
Patent Publication 2: JP-2001-127867A
Patent Publication 3: JP-2002-101179A
Patent Publication 4: JP-2003-244306A
Patent Publication 5: JP-2003-101629A

DISCLOSURE OF THE INVENTION

Problems to be Solved by the Invention

However, the conventional techniques of selecting and starting the function do not refer to or consider the effective use of the operation history in each of a wide variety shapes achieved as a result of the recent change of the shape in a wide variety of ways.

In addition, if cellular phones are exemplified, although there are a larger number of exiting terminals having a two-hinge structure in a fold type or having a slide or swivel structure, and although it is expected that the shapes thereof may restrict the functions that are frequently used therein, the conventional techniques of selecting and stating the function do not consider the history management of the function based on different shapes or consider the restart of a function used in the shape.

Thus, it is an object of the present invention to solve the above problems and to provide a portable data terminal which is capable of starting a desired function by a less number of key operations compared to the conventional techniques without using complicated key operations or memorizing the management number of the functions, as well as a function selecting and starting method used therein.

Means for Solving the Problems

The present invention provides a portable data terminal including: a housing mounting thereon a plurality of function key switches and having controllable shapes; a function execution section for executing a plurality of functions assigned to the function key switches; at least one sensor for detecting a controllable shape of the housing; a history storage section for storing therein function execution history wherein a function executed by the function execution section corresponds to a controllable shape of the housing at which a corresponding function is executed; a retrieval section for retrieving, based on the controlled shape of the housing detected by the sensor, at least one function history corresponding to the detected shape of the housing from the function execution history, to display the retrieved function history and a corresponding one of the function key switches on a display unit; and a control section for allowing the function execution section, upon depression of one of the function key switches, to execute a function assigned to the depressed function key.

The present invention also provides a method for selecting and starting a function, used in a portable data terminal having controllable shapes, including: detecting a controllable shape of the housing; storing a function execution history including a function executed in the portable data terminal and a controllable shape of the housing at which the function is executed; retrieving, based on the controlled shape of the housing, at least one function history corresponding to the detected shape of the housing from the function execution history, to display the retrieved function history and a corresponding function switch on a display unit; and executing, upon detection of depression of one of the function key switches, to execute a function allocated to the depressed function key.

Effects of the Invention

The portable data terminal and function selecting and starting method of the present invention achieve the advantage of capable of starting the desired function by a less number of key operations compared to the conventional techniques without using complicated key operations or memorizing the management number of the functions. Here, the functional sections, such as each function execution section and history storage section, may be configured by a CPU for which the processings are defined by programs, for example.

A preferred embodiment of the present invention features a fold-type device including: means for detecting each shape of the device including open/close or two-hinge swivel movements; means for storing the function history used at detected each shape; means for displaying the stored function history on a LCD (Liquid Crystal Display) as a menu; control means for assigning the corresponding function history to a side key, wherein, upon detecting a shift to each shape, the function history used at the shape is assigned to the side key, and the corresponding function history displayed on the LCD is selected, thereby allowing a desired function to be selected and started in a moment by a single or minimum number of key operations.

As described above, in the preferred embodiment of the present invention, the latest function selection operation which is used according to each shape is stored as a function history, and is displayed on the LCD as a function history menu, and the corresponding function is assigned to the side key, whereby the function used once at each shape can be started only selection using the side key, and more specifically, a desired function can be started by a single key operation.

Thus, in the preferred embodiment of the present invention, it is unnecessary to perform complicated key operations which consecutively select the means of a hierarchical structure or to memorize the management number of the functions, whereby it is possible to call the functions consecutively in an order from the function used last at each shape, and thus the functions (up to three functions, for example) used in the past at the each shape can be started in a moment by a mere single depression of the side key.

BEST MODE FOR CARRYING OUT THE INVENTION

Figure 1:
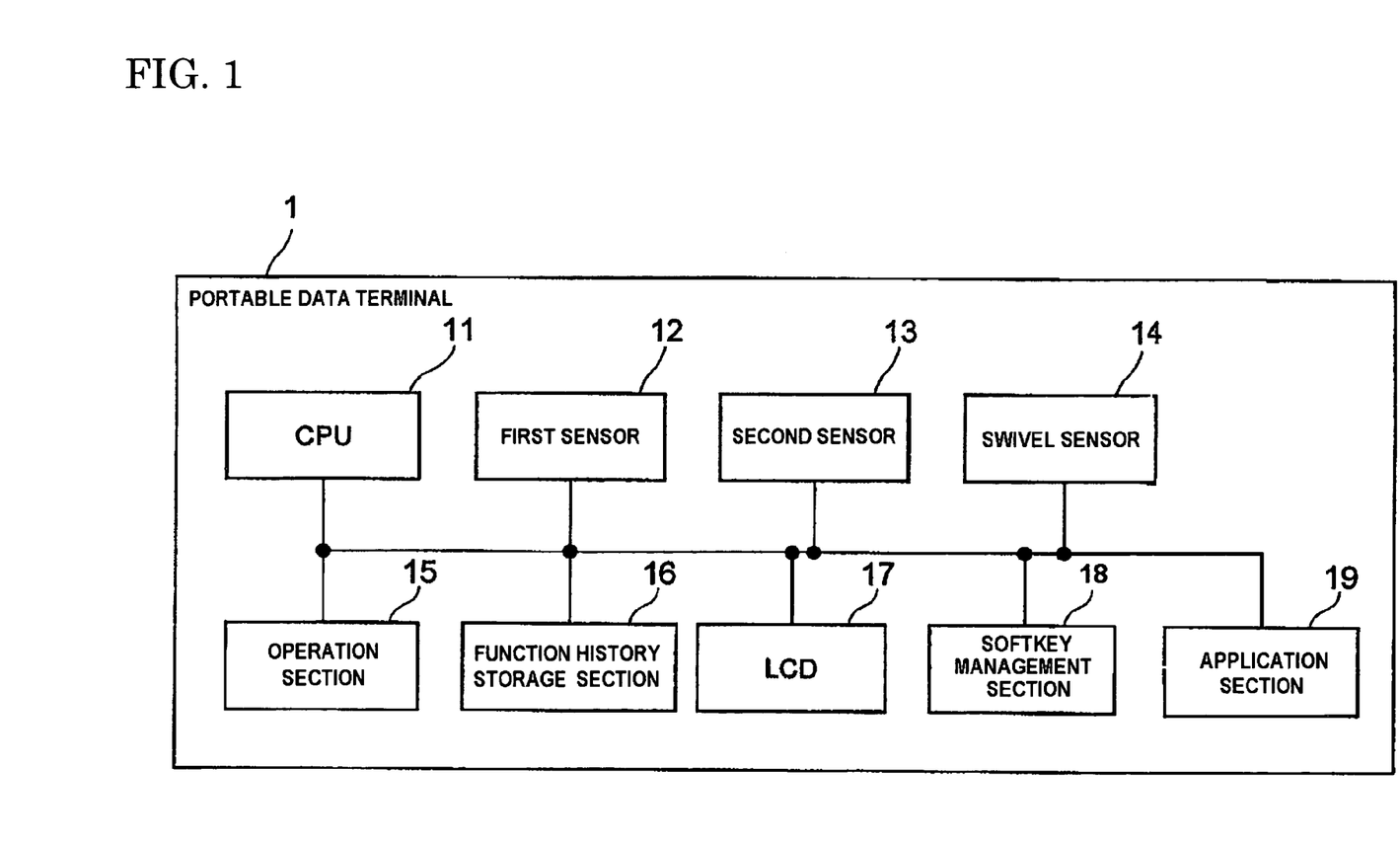
FIG. 1 is a block diagram showing the configuration of a fold-type portable data terminal according to one exemplary embodiment of the present invention.

Next, embodiments of the present invention will be described with reference to the drawings. FIG. 1 is a functional block diagram showing the configuration of a fold-type portable data terminal according to one exemplary embodiment of the present invention. In FIG. 1, the fold-type portable data terminal 1 includes CPU 11, first sensor 12, second sensor 13, swivel sensor 14, operation section 15, function history storage section 16, LCD (Liquid Crystal Display) section 17, softkey management section 18, and application section 19. Illustration of a radio section, a power supply section, etc. which are not directly related to description of the present exemplary embodiment as well as the explanation thereof is omitted in FIG. 1.

Figure 2:
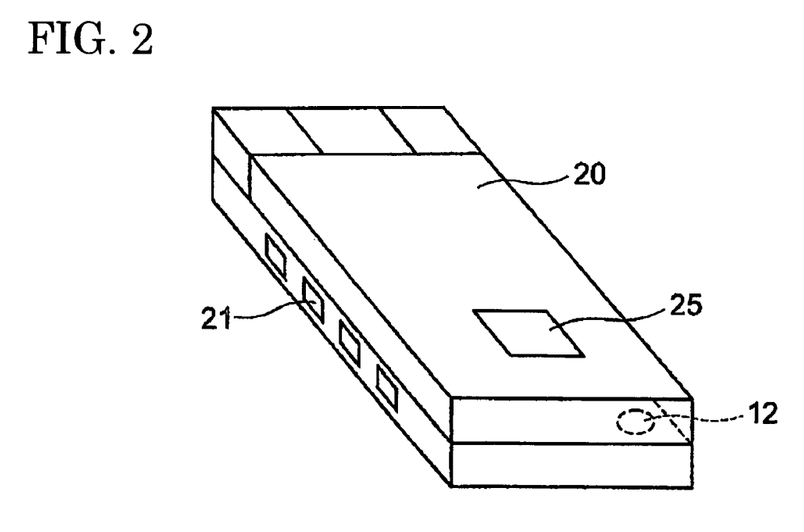
FIG. 2 is a perspective view showing each shape of the fold-type portable data terminal according to the one exemplary embodiment of the present invention.
Figure 3:
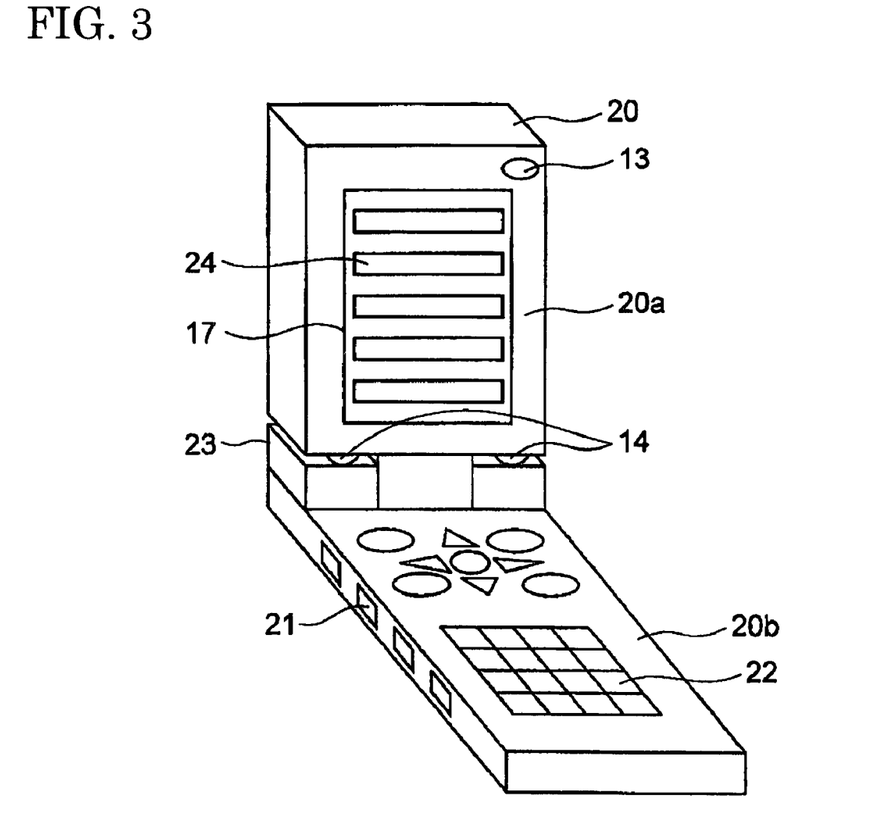
FIG. 3 is a perspective view showing each shape of the fold-type portable data terminal according to the one exemplary embodiment of the present invention.
Figure 4:
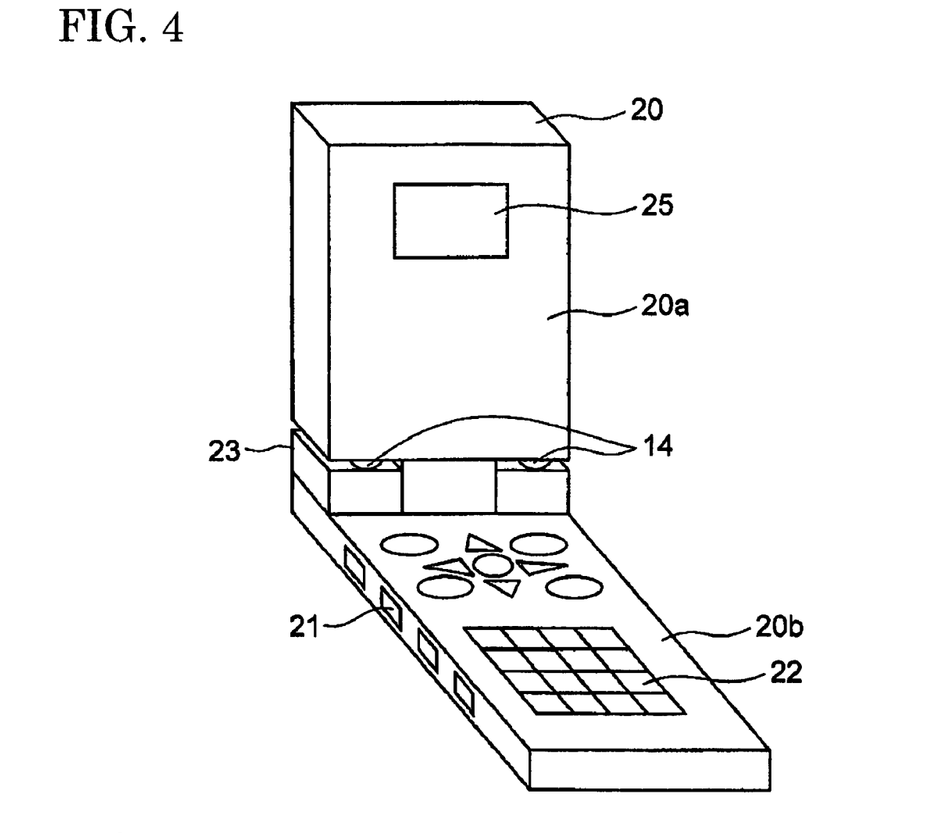
FIG. 4 is a perspective view showing each shape of the fold-type portable data terminal according to the one exemplary embodiment of the present invention.
Figure 5:
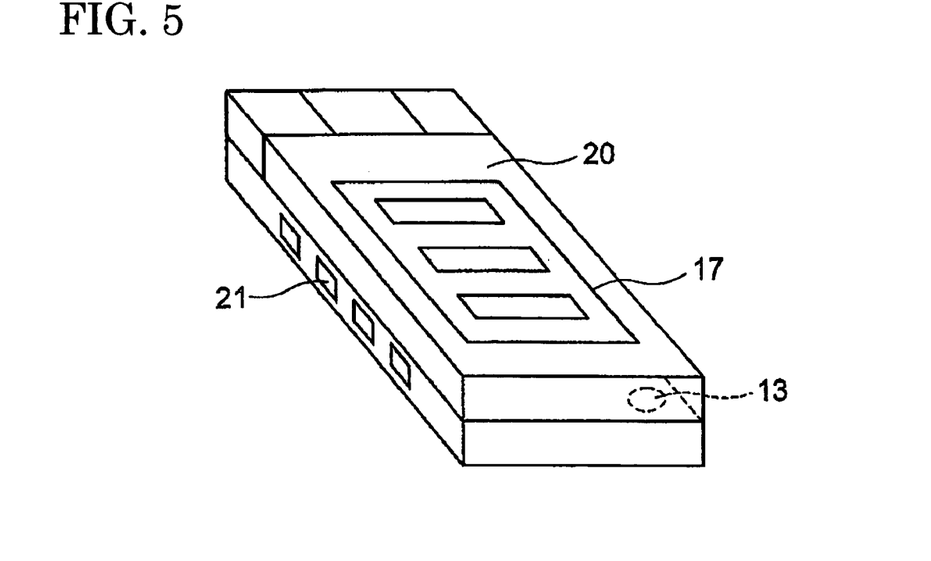
FIG. 5 is a perspective view showing each shape of the fold-type portable data terminal according to the one exemplary embodiment of the present invention.

FIGS. 2 to 5 are perspective views showing each shape (mode) of the fold-type portable data terminal 1 according to the one exemplary embodiment of the present invention. In FIG. 2, the fold-type portable data terminal has a fold-type housing 20, has two or more side keys 21 on the side surface of the housing 20, and has a logo 25 on the front surface. The fold-type housing 20 has the first sensor 12 which detects whether or not the fold-type housing 20 is in a folded position (first closed position). FIG. 3 shows the fold-type housing 20 in an open position where the receiver housing (first housing member) 20a is opened from a microphone housing (second housing member) 20b by 90 degrees. The receiver housing 20a includes on the front surface thereof a second sensor 13 which detects whether or not the fold-type housing 20a is in the folded position (second closed position), and a LCD 17. The first sensor 12 detects that the receiver housing 20a is in the first closed position if the receiver housing 30a is in a swivel position at a swiveled angle of zero degree, whereas the second sensor 13 detects that the receiver housing 20a is in a second closed position, wherein the receiver housing 20a is opened with respect to the microphone housing in an angular position of 90 degrees from the first closed position shown in FIG. 2, swiveled therefrom into a swiveled position at a swivel angle of 180 degrees and again closed to the receiver housing. The microphone housing 20b includes on the front surface thereof a keyboard 22, and includes on the side surface thereof the side keys 21 as described before. The keyboard 22 and side keys 21 configure the operational section 15. FIG. 4 shows that fold-type housing in the state wherein the receiver housing 20a is in the swiveled position at a swivel angle of 180 degrees, whereas FIG. 5 shows the receiver housing 20a in a second closed position wherein the receiver housing is closed in the swiveled state at a swivel angle of 180 degrees.

The CPU 11 manages the overall control of the fold-type portable data terminal 1, and the first sensor 12 detects the event in which the receiver housing 20a is normally opened or closed from/to the microphone housing 20b by way of hinge 23. The second sensor 13 detects the even tin which the receiver housing 20a is opened or closed from the 180-degree-swiveled state thereof, whereas the swivel sensor 14 detects that the receiver housing 20a is in a swivel state of 0 degree or 180 degrees.

The operational section 15 executes various types of key operations, and the function history storage section 16 stores therein the history of functions used for each shape. The LCD 17 performs display of a function history menu 24 as well as an ordinary screen image, and the softkey management section 18 manages the functions allocated to the side keys 21 as well as the history menu 24 displayed on the LCD. The application section 19 realizes TV (Television) function, FM (Frequency Modulation) radio function, and Internet browsing function.

Figure 6:
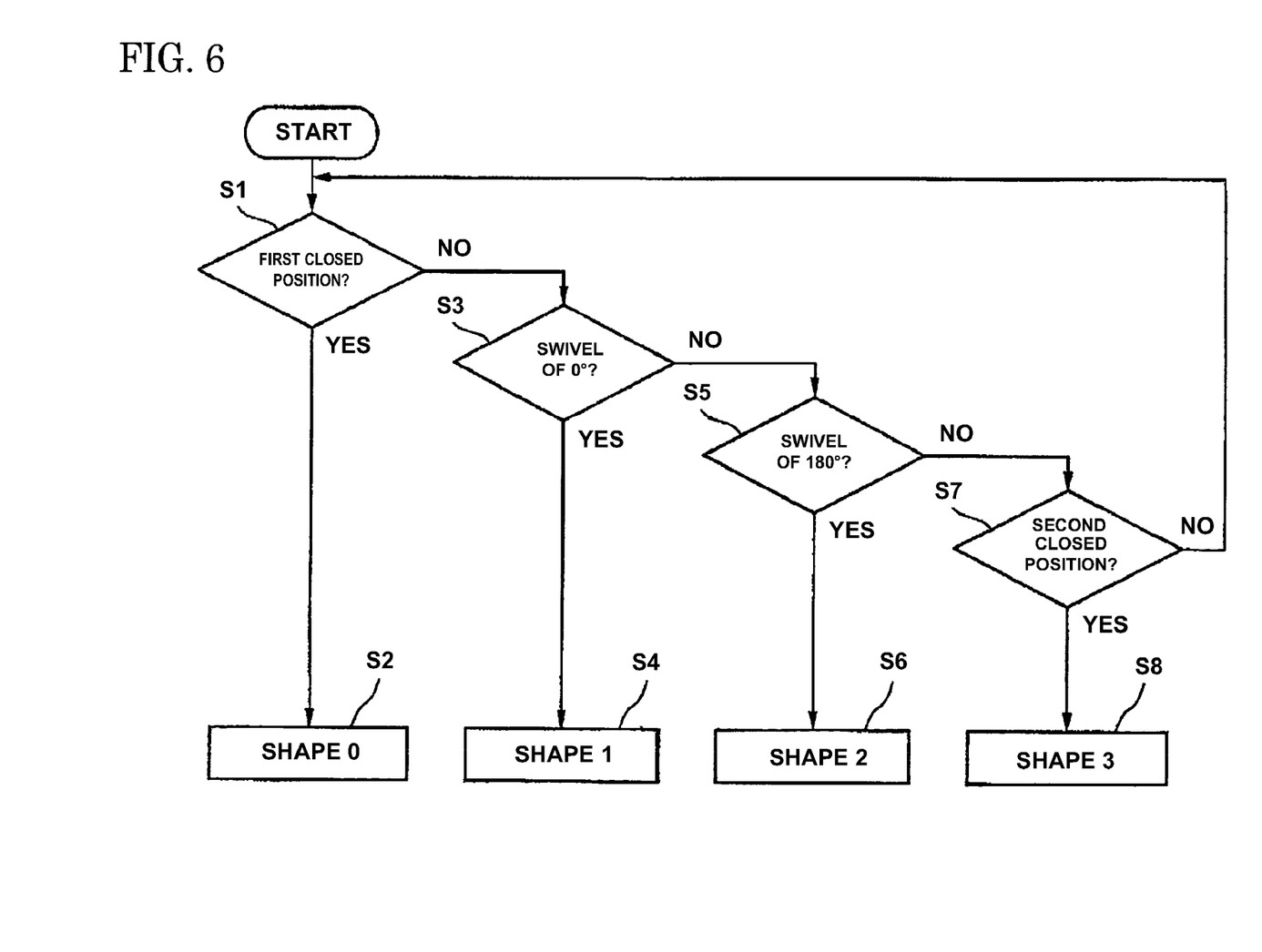
FIG. 6 is a flowchart which shows detection processing of form change of the fold-type portable data terminal according to the one exemplary embodiment of the present invention.
Figure 7:
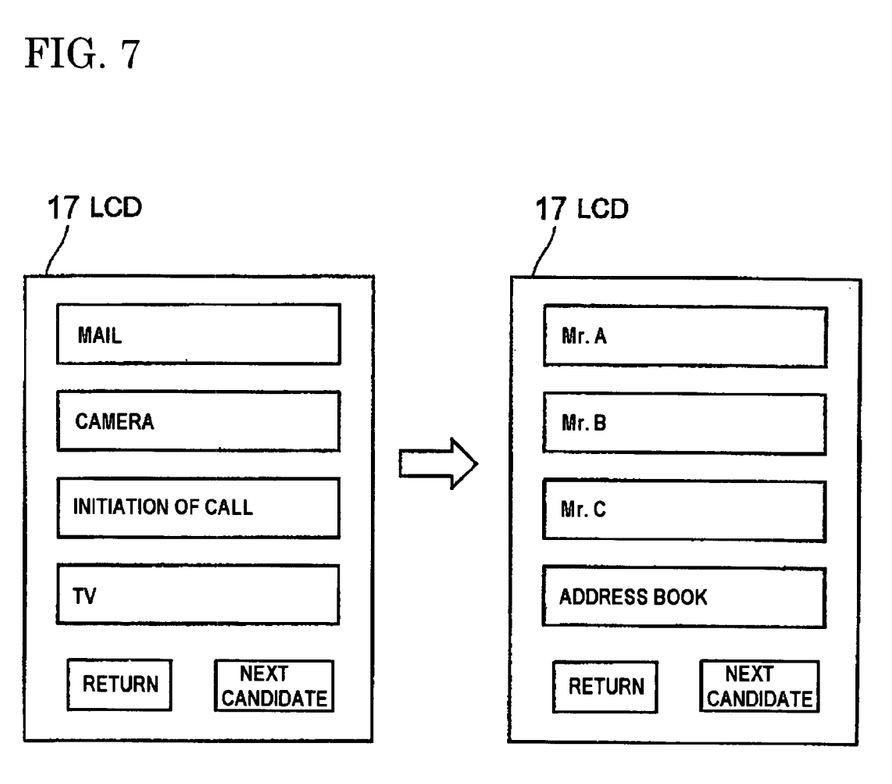
FIG. 7 is a chart showing a screen transition of LCD of FIG. 1.
Figure 8:
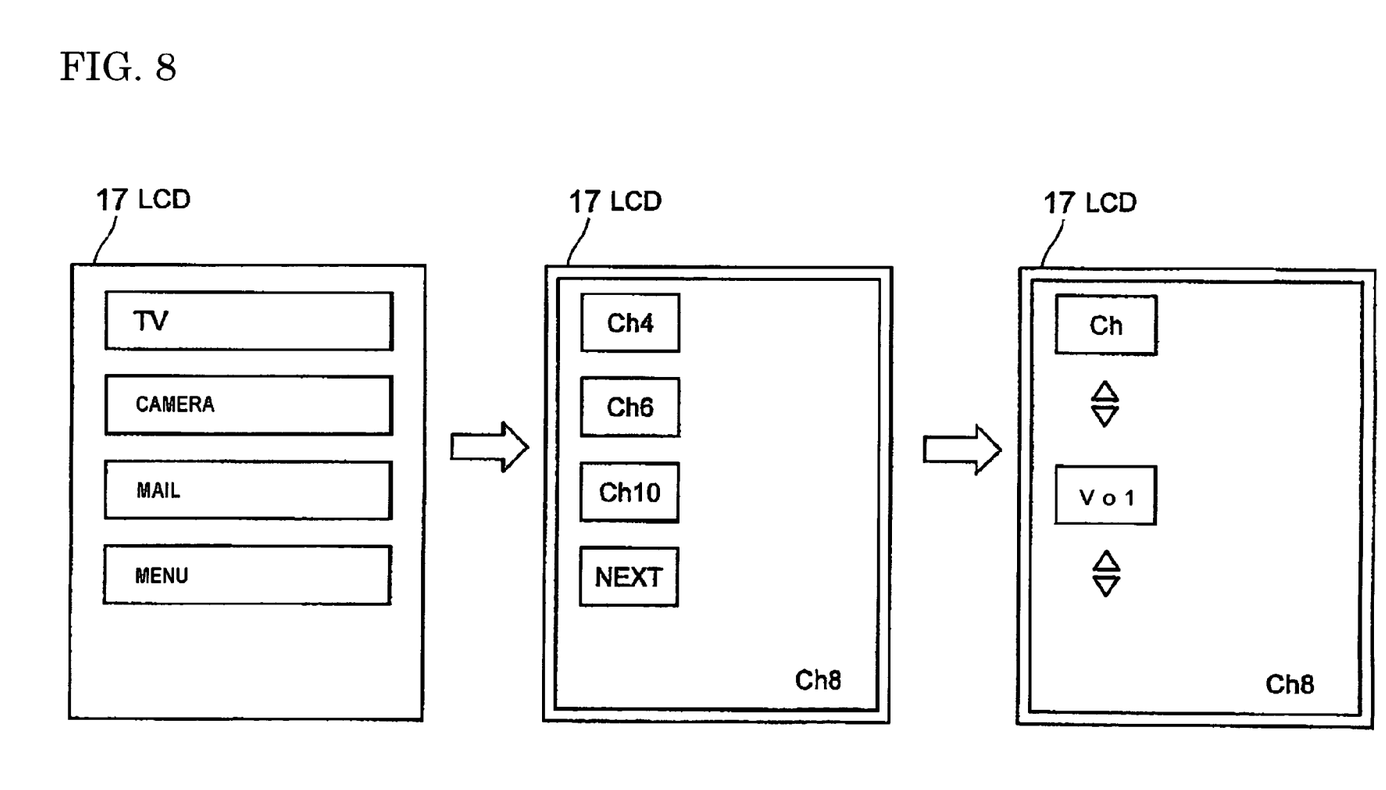
FIG. 8 is a chart showing another screen transition of LCD of FIG. 1.

FIG. 6 is a flowchart which shows the processing of detecting the shape change of the fold-type portable data terminal 1 according to the one exemplary embodiment of the present invention, and FIGS. 7 and 8 are charts showing a screen transition on the LCD 17 of FIG. 1. With reference to those FIGS. 1 to 8, the storage operation for the function history at each shape of the fold-type portable data terminal 1 according to the one exemplary embodiment of the present invention will be described.

First, in the fold-type portable data terminal 1, the CPU 11 judges whether or not the fold-type housing 20 is in the state (the first closed position shown in FIG. 2), wherein the fold-type housing is closed with the LCD 17 being inner side, based on the result of detection by the first sensor 12 (step S1 in FIG. 6), and judges the sate wherein the receiver housing 20a is closed in the first closed position with the LCD 17 being inner side as the state of "shape 0" (step S2 in FIG. 6).

When a read function of the current time instant is operated by the side key 21, for example, in this state of "shape 0", the CPU 11 stores the read function of the current time instant as a function history of "shape 0" in the function history storage section 16. If the function history is set effective without any condition, the function history is started upon a shift to "shape 0", although the available functions are limited in this case because the LCD 17 cannot be observed in the fold-type portable data terminal 1 of the present embodiment.

If the receiver housing 20a is subsequently opened from the state of shape 0, the fact that the receiver housing 20a is opened is transmitted to the CPU 11 by the first sensor 12. In this case, the CPU 11 judges whether or not the swiveled amount is zero degree based on the result of detection by the swivel sensor 14 (step S3 in FIG. 6), and judges the state of "shape 1" if zero degree is recognized (step S4 in FIG. 6).

If the application section 19 transmits a mail, for example, in this state of "shape 1", the CPU 11 stores the mail transmission operation as a function history of the "shape 1" in the function history storage section 16. It is assumed here that the initial state of each shape has a default priority function, and the default function is replaced by the used function.

If the receiver housings 20a is swiveled by 180 degrees from the above state, the fact that the receiver housings 20a is swiveled by 180 degrees is transmitted to the CPU 11 by the swivel sensor 14. In this case, the CPU 11 judges whether or not a 180-degree swivel has occurred based on the result of detection by the swivel sensor 14 (step S5 in FIG. 6), and judges the state of "shape 2" shown in FIG. 4 if a 180-degree swivel has occurred (step S6 in FIG. 6).

If the application section 19 selects a function of photographing by camera in this state of "shape 2", the CPU 11 stores the selection operation of the function of photographing by camera as a function history at "shape 2 in the function history storage section 16. Here, in the detection operation by the swivel sensor 14 as to the 0-degree or 180-degree state in FIG. 3, it is possible to detect the 0-degree or 180-degree swivel amount by disposing two lead switchers at different positions, using a magnet located at a left-right asymmetry thereto and adjacent to the swivel sensor 14 of the receiver housing 20a, and judging which one of the lead switches is ON.

Although FIG. 3 does not illustrate the camera section, it may be disposed at the rear side of the microphone housing 20b etc. If the receiver housing 20a is at a swivel mount of 0 degree upon photographing by camera, a normal mode wherein the scenery or other person is to be photographed is judged, whereas if the receiver housing is at a swivel amount of 180 degrees, a self-photographing mode wherein the user is to be photographed is recognized.

If the receiver housing 20a is closed from the above 180-degree-swiveled state, the fact that the receiver housing 20a is closed at the 180-degree-swiveled state is transmitted to the CPU 11 by the second sensor 13. In this case, the CPU 11 judges whether or not the receiver housings 20a is closed at the 180-degree swiveled state based on the result of detection by the second sensor 13 (step S7 in FIG. 6), and judges the state of FIG. 5 wherein the receiver housing 20a is closed into the second closed position as the state of "shape 3" (step S8 in FIG. 6).

If the application section 19 selects a TV function in this state of "shape 3", for example, the CPU 11 stores the selection operation of TV function as a function history at "shape 3" in the function history storage section 16.

By the above operations, the function history corresponding to each shape is stored in the function history storage section 16. Although a single operation is shown as the function history at each shape in this description, it is possible that three operations, for example, are stored therein or an arbitrary number of histories are stored therein.

Next, the operation in the case of each of the above "shape 0" to "shape 3" will be described. First, if the receiver housing 20a is closed with the LCD 17 being at the inner side in the above example, the fact that the receiver housing 20a is closed is notified to the CPU 11 by the first sensor 12. The CPU 11 judges the first closed position based on the result of detection by the first sensor 12 (step S1 in FIG. 6), and recognizes the state of "shape 0" shown in FIG. 2 (step S2 in FIG. 6). In this case, the CPU 11 reads the function history of "shape 0" from the function history storage section 16, and starts the read function of the current time instant.

If the receiver housing 20a is subsequently opened normally, the CPU 11 judges whether or not the swivel amount of the receiver housing 20a is 0 degree based on the result of detection by the swivel sensor 14 (step S3 in FIG. 6), and recognizes the state of shape 1 shown in FIG. 3 if the swivel amount is 0 degree (step S4 in FIG. 6). In this case, the CPU 11 reads the function history of shape 1 from the function history storage section 16, displays the function history menu 24 on the LCD 17 by way of the softkey management section 18, and allocates the side key 21 to the function corresponding to the function history menu 24 by way of the softkey management section 18.

More concretely, display of the function history menu 24 on the LCD 17 is the display shown FIG. 7, for example, and the function corresponding to the displayed menu is assigned to the side key 21. In this case, the top row corresponds to "mail", the second row corresponds to "camera", the third row corresponds to "initiating call", and the fourth row corresponds to "TV". The top "mail" is the function used most recently as described with respect to the storage operation, and second and preceding functions used at the "shape 1" are displayed, or the default functions are displayed if such functions are not used thereat.

As a concrete example, if the function such as a mail transmission or photographing by cameral which is used at the "shape 1" previously is to be used again, the corresponding side key 21 is depressed once to call the corresponding function directly. If the mail transmission is to be performed again, the side key 21 corresponding to the top mail is depressed, whereby the screen shows a transition state as shown in FIG. 7 and shifts to the screen for selecting the destination for the transmission.

Again, the screen shows destinations in the order from the most recent destination (in the example shown in FIG. 7, order of "Mr. A", "Mr. B", "Mr. C" and address book), and the next depression of the side key 21 selects the destination for the transmission.

If the receiver housings 20a is subsequently swiveled by 180 degrees, the CPU 11 judges whether or not the receiver housings 20a is swiveled by 180 degrees based on the result of detection by the swivel sensor 14 (step S5 in FIG. 6), similarly to the above case, and recognizes the state of "shape 2" if a 180-degree swivel has occurred (step S6 in FIG. 6). In this case, the CPU 11 reads the function history of "shape 2" from the function history storage section 16, whereby the camera function is displayed as the function history on the top of LCD 17. If the photographing by camera is to be performed, the corresponding side key 21 is depressed only once to start the cameral function.

If the receiver housing 20a is subsequently closed in the 180-degree-swiveled state, the CPU 11 judges whether or not the receiver housing 20a is in a closed state based on the result of detection by the second sensor 13 (step S7 in FIG. 6), and recognizes the state of "shape 3" if the receiver housing 20a is closed (step S8 in FIG. 6), similarly to the above. In this case, the CPU 11 reads the function history of "shape 3" from the function history storage section 16, whereby the TV function is displayed on the top of LCD 17 as the function history menu 24 and the state of screen shown in FIG. 8 is obtained.

Since the LCD 17 is not provided with an operation key in the present exemplary embodiment, the indication such as "return" or "next candidate" exemplified on the LCD shown in FIG. 7 cannot be selected. Thus, such an indication is not provided herein.

If it is desire to watch the TV again, the side key 21 corresponding to the top row of the LCD 17 is depressed to obtain the transition shown in FIG. 8, whereby reception of the 8th channel is started if the 8th channel was watched previously. However, since there is a possibility that the channel (Ch) is switched quickly, an example is shown in the present embodiment wherein a single depression of the side key 21 within a specific time interval can change the channel until the change of three stations.

In an exemplified configuration, once the channel is fixed, the state of screen is subjected to a transition whereby the change of channel and setting of the volume (Vol) can be operated by the side key 21. Since the change of channel and setting of volume are obstacle against TV watching and listening, it is preferable to erase the display after a specific period of time. However, the configuration is such that the change of channel and setting of volume can be operated by the side key 21 after the display is erased.

The configuration may be such that the user can set use or nonuse of the function of the function history for each shape as described above.

As described heretofore, in the present embodiment, the latest function selection operation used according to each shape of the portable data terminal 1 is stored in the function history storage section 16 as the function history, and is displayed as the function history menu 24 on the LCD 17, and the corresponding function is assigned to the side key 21, whereby a desired function can be started by only selection of the function used for each shape by the function key 21, in other word, only by a single key operation.

Thus, in the present embodiment it is neither necessary to perform complicated key operations wherein the menus in the hierarchical structure are consecutively selected, nor necessary to memorize the management number of the functions, whereby the functions can be called in the order from the function used last for each shape, and a mere single depression of the corresponding side key 21 can start the desired functions (up to three functions used in the past) in a moment.

It is to be noted that the present invention may be such that selection of the function history menu 24 by the side key 21 does not necessarily start the corresponding function and may cause display of the related function block menu at most. More concretely, if photographing by camera is executed, the function history menu may display a variety of setting functions including photographing by camera, screen viewer and camera function, without a direct transition to the photographing mode.

The configuration of the present invention may be such that the user can register whether the function history itself is executed for each function block, or the function block menu is displayed at most.

Figure 9:
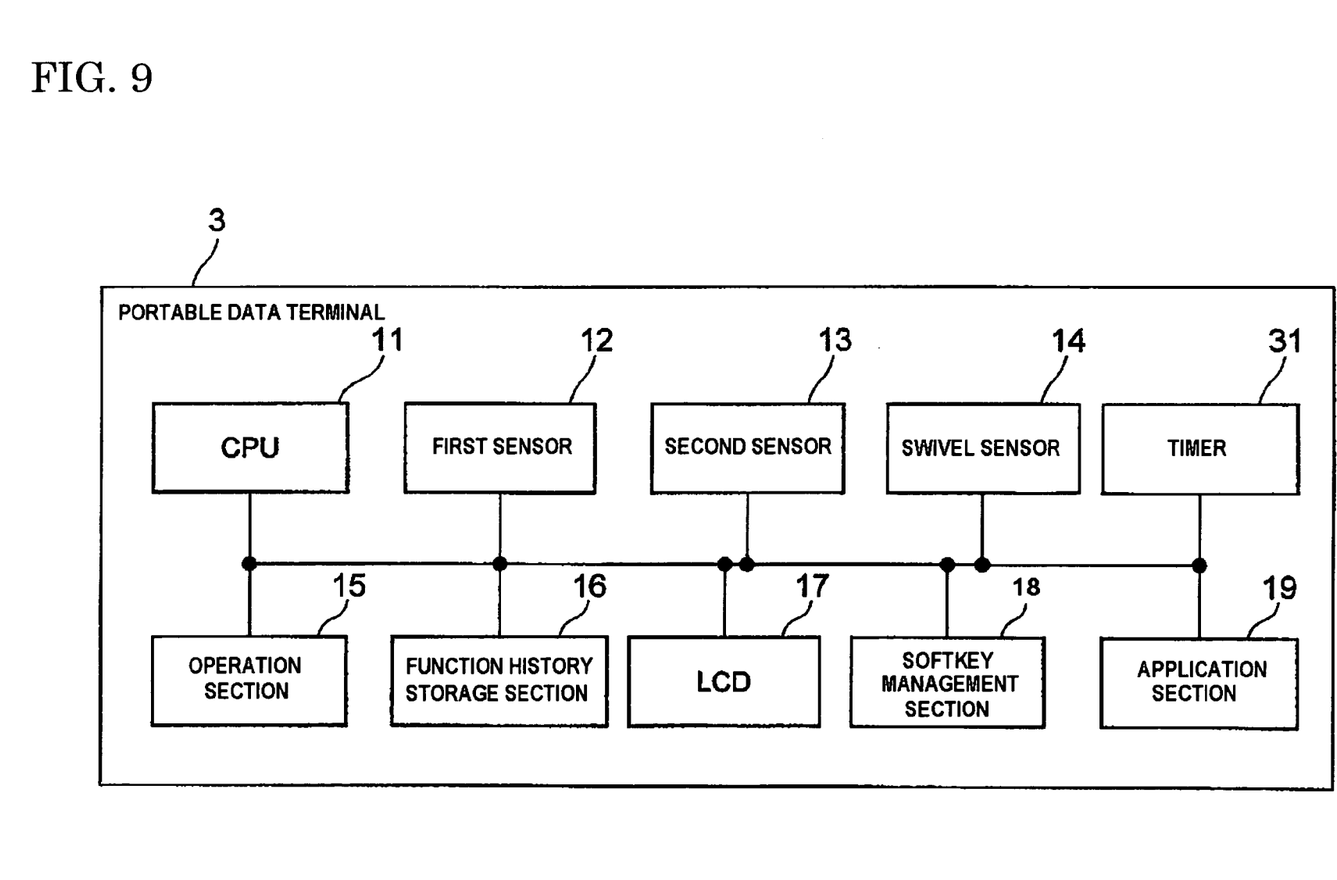
FIG. 9 is a block diagram showing the configuration of a fold-type portable data terminal according to another exemplary embodiment of the present invention.

FIG. 9 is a block diagram showing the configuration of a fold-type portable data terminal according to another exemplified embodiment of the present invention. In FIG. 9, the fold-type portable data terminal 3 of the another embodiment of the present invention has a configuration similar to that of the fold-type portable data terminal 1 of the one exemplary embodiment of the present invention shown in FIG. 1 except that a timer 31 is provided therein, and similar constituent elements are designated by similar reference numerals.

Although the latest function history is performed without any condition for "shape 0" in the one embodiment of the present invention, the configuration may be such that the CPU 11 starts the timer 31 after detection of each shape, and a timeout is notified therefrom to the CPU 11 after one second elapsed (it is preferable to provide means for setting this period of time by the user). In this configuration, if the selection is not performed by the side key 21, the latest function operated for each shape, i.e., the function corresponding to the top row of the function history is executed as it is.

Means for setting by the user as to whether the latest function is automatically performed or the function history menu 24 is displayed at most may be provided. More concretely, if TV reception is performed last at "shape 3", a shift to "shape 3" can start automatically the TV reception after the timeout.

Figure 10:
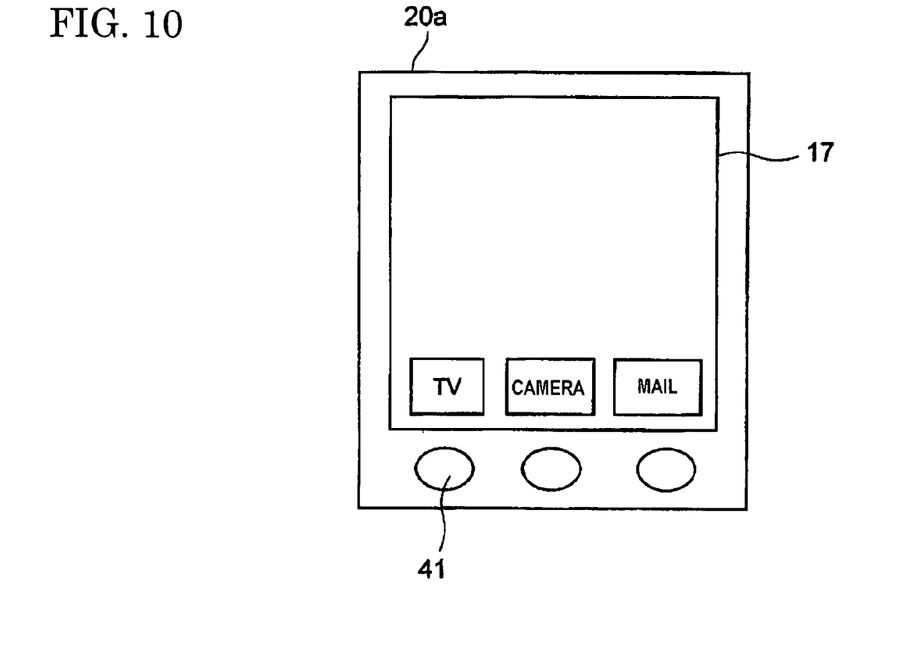
FIG. 10 is a chart showing an example of the configuration of a receiver housing according to another exemplary embodiment of the present invention.

FIG. 10 is a chart showing an example of the configuration of a receiver housing according to another exemplary embodiment of the present invention. In FIG. 10, a function key 41 is provided on the receiver housing 20*a* in the receiver housing according to the another exemplary embodiment of the present invention.

Although the side key 21 is used to select the function of the softkey in the one embodiment of the present invention, the present embodiment is such that the function history menu 24 is displayed in a smaller size on the bottom side of the LCD 17 corresponding to the function key 41 on the receiver housing 20*a*.

The configuration of the present invention may be such that the number is selected by a numerical keypad on the operational key section 22 of the operational section 15, other than the use of the side key 21 or selection by the softkey by using the function key 41. In this case, it is necessary to add the number to the function history.

The present invention may be such that a larger number of functions can be started without a specific operation by using the angle in the midway of the receiver housing 20*a* during opening/closing or swiveling thereof as the pattern of shape, for automatically starting the latest operation of the function history. In this case, the operation may be determined by a key operation other than the timeout of the timer 31 and a menu key. For example, if the configuration is such that the angle of the receiver housing 20*a* during opening/closing can be identified at five steps, and if the five stations are selected as the channel of TV reception at respective steps, in the next time, each step can automatically select the reception channel by changing the angle of the closing/opening of the receiver housing 20*a*.

The above description is directed to the angle of the receiver housing 20*a* for closing or opening and the channel selection; however, the combination of the shape and operation is arbitrary, and may be matched with a variety of tastes of the users.

The above description is directed to an example of closing/opening and swiveling of the receiver housing 20*a* and the exemplary embodiment is directed to the use of a lead switch as an example of the detection means, swivel sensor 14. However, the detection means for each shape may be a variety of detection means such as photosensor. The amount of slide in the case of a slide type, closing/opening in the case of flap type, and the conditions in a device including a variety of sensors such as an acceleration sensor may also be used as the pattern of the shape.

Figure 11:
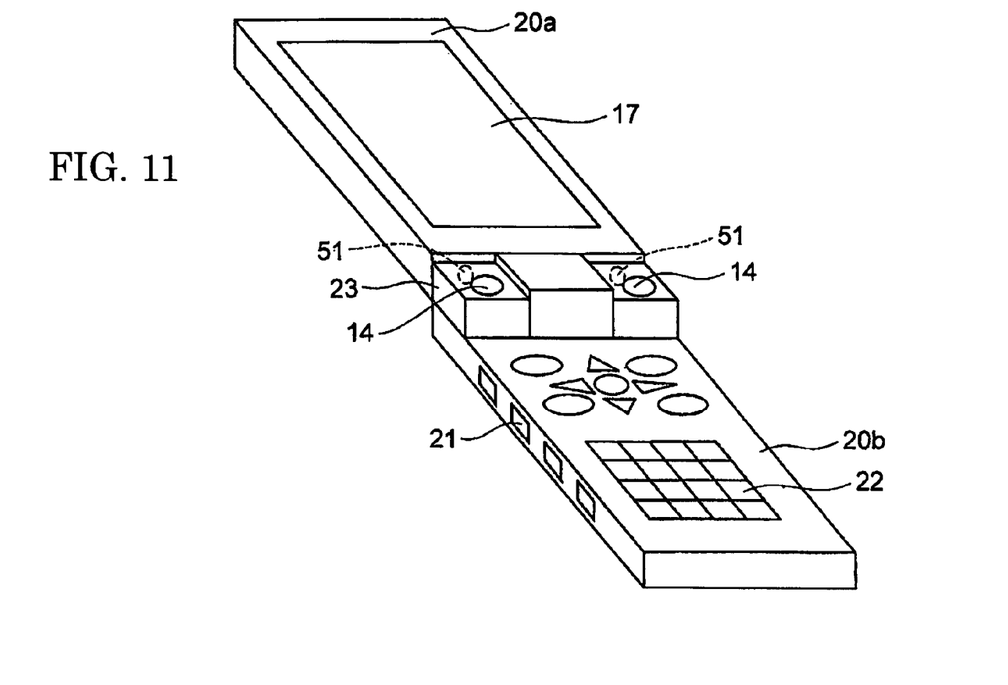
FIG. 11 is a perspective view showing an example of the configuration of a fold-type portable data terminal according to another exemplary embodiment of the present invention.

The swivel sensor 14 shown in FIG. 3 cannot detect a swivel other than the swivel in a 90-degree-opened state. However, as shown in FIG. 11, provision of a rear-surface swivel sensor 51 allows a swivel detection in the state where the receiver housing 20*a* is opened by 180 degrees, which further increases the range of variation of the shape.

INDUSTRIAL APPLICABILITY

The present invention is applicable to cellular phones of a variety of types (fold type, slide type, flap type, etc.) such as described above, a PDA (Personal Digital assistant), a mobile-type personal computer, etc.

The invention claimed is:

1. A portable data terminal comprising:
   a housing mounting thereon a plurality of function key switches and having controllable shapes;
   a function execution section for executing a plurality of functions assigned to said function key switches;
   at least one sensor detecting a controllable shape of said housing;
   a history storage section for storing therein a function execution history wherein a function executed by said function execution section corresponds to a controllable shape of said housing at which a corresponding function is executed;
   a retrieval section for retrieving, based on said controlled shape of said housing detected by said sensor, at least one function history corresponding to said detected shape of said housing from said function execution history, to display the retrieved function history and a corresponding one of said function switches on a display unit; and
   a control section for allowing said function execution section, upon depression of one of said function switches, to execute a function assigned to the depressed function key.

2. The portable data terminal according to claim 1, wherein said housing includes first and second housing members, which are controllably coupled together between an open position and a closed position.

3. The portable data terminal according to claim 2, wherein said first housing member is capable of being swiveled relative to said second housing member, shapes of said housing include a first closed position wherein said first housing member is closed to said second housing member, a first open position wherein said first housing member is opened by 90 degrees with respect to said second housing member from said first closed position, a second open position wherein said first housing member is swiveled by a swivel angle of 180 degrees with respect to said second housing member from said first open position, and a second closed position wherein said first housing member is closed to said second housing member from said second open position.

4. The portable data terminal according to claim 1, wherein said control section does not perform retrieval of said function execution history or display of a retrieval result in response to a setting input from outside.

5. The portable data terminal according to claim 1, wherein said control section additionally displays, upon depression of a function switch, a function block included in functions corresponding to the depressed function switch.

6. The portable data terminal according to claim 1, wherein said retrieval section displays, upon display of said function execution histories, said execution histories in an order of used histories and/or in an order of used frequency.

7. The portable data terminal according to claim 6, further comprising a timer for starting a time count upon detection of a change of shape by said sensor, wherein said retrieval section shifts an execution function from display in an order of used history to display in an order of used frequency after said timer detects a timeout.

8. The portable data terminal according to claim 1, wherein said function key switches each are either a side key provided on a side surface of said housing, an operational key provided on an operational surface of said housing, or a touch panel key formed on said display unit.

9. The portable data terminal according to claim 1, wherein said housing includes first and second housing members which are slidably coupled to one another.

10. The portable data terminal according to claim 1, wherein said housing allows a cover covering said display unit and/or said operational switch to be closed or opened.

11. A method for selecting and starting a function, used in a portable data terminal having controllable shapes, comprising:
  detecting a controllable shape of said housing;
  storing a function execution history including a function executed in said portable data terminal and a controllable shape of said housing at which said function is executed;
  retrieving, based on said controlled shape of said housing, at least one function history corresponding to said detected shape of said housing from said function execution history, to display the retrieved function history and a corresponding function switch on a display unit; and
  executing, upon detection of depression of one of said function key switches, to execute a function allocated to the depressed function key.

12. The method according to claim 11, wherein said housing includes first and second housing members, which are controllably coupled together between an open position and a closed position, and said detecting step detects a rotation of aid first housing member with respect to said second housing member.

13. The method according to claim 12, wherein said first housing member is capable of being swiveled relative to said second housing member, said shapes of said housing include a first closed position wherein said first housing member is closed to said second housing member, a first open position wherein said first housing member is opened by 90 degrees with respect to said second housing member from said first closed position, a second open position wherein said first housing member is swiveled by a swivel angle of 180 degrees with respect to said second housing member from said first open position, and a second closed position wherein said first housing member is closed to said second housing member from said second open position.

14. The method according to claim 11, wherein said retrieval step of said function execution history is not performed in response to a setting input from outside.

15. The method according to claim 11, further comprising the step of additionally displaying, upon depression of a function switch (21), a function block included in functions corresponding to the depressed function switch.

16. The method according to claim 11, wherein said displaying said function execution history displays said execution history in an order of used histories and/or in an order of used frequency.

17. The method according to claim 16, further comprising starting a time count upon detection of a change of shape in said detecting step, and shifting an execution function from a display in an order of used histories to a display in an order of used frequency after said timer detects a timeout.

18. The method according to claim 11, wherein said function key switches each are either a side key provided on a side surface of said housing, an operational key provided on an operational surface of said housing, or a touch panel key formed on said display unit.

19. The method according to claim 11, wherein said housing includes first and second housing members which are slidably coupled to one another, and said detecting step detects a slide of said first housing member with respect to said second housing member.

20. The method according to claim 11, wherein said housing allows a cover covering said display unit and/or said operational switch to be closed or opened.

* * * * *